United States Patent
Ouyang et al.

(10) Patent No.: US 10,554,898 B2
(45) Date of Patent: Feb. 4, 2020

(54) METHOD FOR DUAL-CAMERA-BASED IMAGING, AND MOBILE TERMINAL

(71) Applicant: GUANGDONG OPPO MOBILE TELECOMMUNICATIONS CORP., LTD., Dongguan, Guangdong (CN)

(72) Inventors: Dan Ouyang, Dongguan (CN); Guohui Tan, Dongguan (CN)

(73) Assignee: GUANGDONG OPPO MOBILE TELECOMMUNICATIONS CORP. LTD., Dongguan (CN)

(*) Notice: Subject to any disclaimer, the term of this patent is extended or adjusted under 35 U.S.C. 154(b) by 0 days.

(21) Appl. No.: 16/162,601

(22) Filed: Oct. 17, 2018

(65) Prior Publication Data
US 2019/0166294 A1 May 30, 2019

(30) Foreign Application Priority Data
Nov. 30, 2017 (CN) .......................... 2017 1 1239966

(51) Int. Cl.
H04N 5/235 (2006.01)
H04N 5/225 (2006.01)
(Continued)

(52) U.S. Cl.
CPC .......... *H04N 5/2351* (2013.01); *G06T 5/002* (2013.01); *G06T 5/50* (2013.01); *G06T 7/194* (2017.01);
(Continued)

(58) Field of Classification Search
CPC ............. H04N 5/2351; H04N 5/23212; H04N 5/20132; H04N 5/23245; H04N 5/225; H04N 5/2259; H04N 5/23296; H04N 5/23232; H04N 5/23229; H04N 5/2258; H04N 5/2226; G06T 7/571; G06T 5/002; G06T 5/50; G06T 7/194; G06T 2207/20132
(Continued)

(56) References Cited

U.S. PATENT DOCUMENTS 9,325,899 B1  4/2016 Chou et al.
9,414,037 B1  8/2016 Solh
(Continued)

FOREIGN PATENT DOCUMENTS

CN  101637019 A  1/2010
CN  104253939 A  12/2014
(Continued)

OTHER PUBLICATIONS

International Search Report in international application No. PCT/CN2018/114923, dated Jan. 31, 2019.
(Continued)

*Primary Examiner* — Yogesh K Aggarwal

(57) ABSTRACT

Disclosed are methods for dual-camera-based imaging, a mobile terminal. A first image shot by the wide-angle camera and a second image shot by the telephoto camera are acquired. The first image is cropped according to a target region of the first image to acquire a third image. Depth information of the third image is determined according to the third image and the second image. Blurring processing is performed on the third image according to the depth information, to obtain a fourth image.

19 Claims, 9 Drawing Sheets

(51) Int. Cl.
    *H04N 5/232*    (2006.01)
    *H04N 5/222*    (2006.01)
    *G06T 7/194*    (2017.01)
    *G06T 7/571*    (2017.01)
    *G06T 5/00*     (2006.01)
    *G06T 5/50*     (2006.01)

(52) U.S. Cl.
    CPC ............ *G06T 7/571* (2017.01); *H04N 5/2226* (2013.01); *H04N 5/2258* (2013.01); *H04N 5/23212* (2013.01); *H04N 5/23229* (2013.01); *H04N 5/23232* (2013.01); *G06T 2207/20132* (2013.01)

(58) Field of Classification Search
    USPC .......................... 348/223.1–229.1, 362–365
    See application file for complete search history.

(56) References Cited

U.S. PATENT DOCUMENTS

| | | |
|---|---|---|
| 2008/0218611 A1 | 9/2008 | Parulski |
| 2017/0150067 A1 | 5/2017 | Han |
| 2018/0070023 A1* | 3/2018 | Oh ............................ G06T 7/55 |
| 2018/0227478 A1 | 8/2018 | Li |

FOREIGN PATENT DOCUMENTS

| | | |
|---|---|---|
| CN | 104333700 A | 2/2015 |
| CN | 106254780 A | 12/2016 |
| CN | 106454118 A | 2/2017 |
| CN | 106454121 A | 2/2017 |
| CN | 106851104 A | 6/2017 |
| CN | 106911892 A | 6/2017 |
| CN | 106952222 A | 7/2017 |
| CN | 107835372 A | 3/2018 |
| WO | 2017016050 A1 | 2/2017 |

OTHER PUBLICATIONS

English Translation of the Written Opinion of the International Search Authority in international application No. PCT/CN2018/114923, dated Jan. 31, 2019.
Supplementary European Search Report in European application No. 18204956.9, dated Apr. 16, 2019.

* cited by examiner

METHOD FOR DUAL-CAMERA-BASED IMAGING, AND MOBILE TERMINAL

CROSS-REFERENCE TO RELATED APPLICATIONS

This application claims priority to Chinese Patent Application No. 201711239966.0 filed on Nov. 30, 2017, the disclosure of which is incorporated by reference herein in its entirety.

TECHNICAL FIELD

The disclosure relates to the technical field of mobile terminals, and particularly to methods for dual-camera-based imaging, and a mobile terminal.

BACKGROUND

Dual cameras have become widely used in mobile terminal devices. The dual cameras usually include a telephoto lens and a wide-angle lens. The telephoto lens is used to take a photo, while the wide-angle lens is used to assist in calculation of depth information of the photo, so as for subsequent image blurring processing.

The existing dual cameras have a good imaging effect in a high-luminance environment, but have a poor imaging effect in a dark environment.

BRIEF DESCRIPTION OF DRAWINGS

The abovementioned and/or additional aspects and advantages of the application will become apparent and easy to understand from the descriptions made to the embodiments below in combination with the drawings.

DETAILED DESCRIPTION

Figure 1:
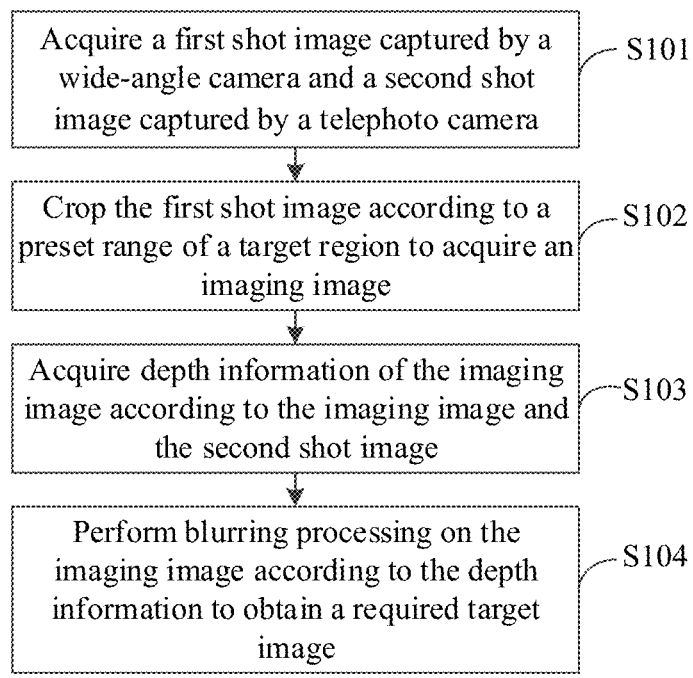
FIG. 1 illustrates a flowchart of a method for dual-camera-based imaging according to an embodiment of the application.

The embodiments of the application will be described below in detail. Examples of the embodiments are illustrated in the drawings and the same or similar reference signs always represent the same or similar components or components with the same or similar functions. The embodiments described below with reference to the drawings are exemplary and intended to explain the application and should not be understood as limits to the application.

The method and device for dual-camera-based imaging, mobile terminal and storage medium of the embodiments of the disclosure will be described below with reference to the drawings.

At a first aspect, a method for dual-camera-based imaging is provided. The dual cameras comprise a wide-angle camera and a telephoto camera, and the method includes the following actions. A first image shot by the wide-angle camera and a second image shot by the telephoto camera are acquired. The first image is cropped according to a target region of the first image to acquire a third image. Depth information of the third image is determined according to the third image and the second image. Blurring processing is performed on the third image according to the depth information, to obtain a fourth image.

In an example, the target region may be a first part of the first image which takes a center of the first image as a center of the target region and spans a range determined according to at least one of the following: an angle of field of view of the wide-angle camera, a resolution of the wide-angle camera, or the ambient light luminance.

In an example, before cropping the first image according to the target region of the first image to acquire the third image, the method may further include determining a distribution region of the first image having a same view as that of the second image. In terms of cropping the first image according to the target region of the first image to acquire the third image, the first image may be cropped to obtain an intersection of a first part of the first image corresponding to the target region and a second part of the first image corresponding to the distributed region as the third image.

In an example, in terms of obtaining the fourth image, when the distribution region fully covers the target region, the first part of the first image corresponding to the target region may be determined to be the third image. When the target region fully covers the distribution region, the second part of the first image corresponding to the distributed region may be determined to be the third image. When the target region and the distribution region have a partially overlapped region, a third part of the first image corresponding to the partially overlapped region may be determined to be the third image.

In an example, before acquiring the first image shot by the wide-angle camera and the second image shot by the telephoto camera, the method may further include metering an ambient light intensity, and when the ambient light intensity is lower than a threshold light intensity, controlling the wide-angle camera to shoot the first image and controlling the telephoto camera to shoot the second image.

In an example, in terms of controlling the wide-angle camera to shoot the first image and controlling the telephoto camera to shoot the second image, the wide-angle camera and the telephoto camera may be controlled to perform view finding simultaneously, so as to acquire the first image for imaging and the second image for calculating a depth of field.

In an example, after determining depth information of the third image, the method may include, for each of a plurality of objects in the third image, determining whether the object is a foreground object or a background object according to depth information of the object. In terms of performing blurring processing on the third image according to the depth information to obtain a fourth image, blurring processing may be performed on the object determined to the background object, to obtain the fourth image.

In an example, in terms of metering the ambient light intensity, one of the following may be performed: metering the ambient light intensity by using an independent photometric component; acquiring the ambient light intensity by using an image sensor; or reading automatically regulated International Organization for Standardization (ISO) values of the wide-angle camera and the telephoto camera, determining an ambient luminance according to the read ISO values, and determining the ambient light intensity according to a mapping relationship of ambient luminance values and ambient light intensity values.

In an example, after metering the ambient light intensity, the method may further include acquiring a selected view finding mode when the ambient light intensity is higher than or equal to the threshold light intensity. When the view finding mode is a close shot mode, depth information of the first image may be determined according to the first image shot by the wide-angle camera and the second image shot by the telephoto camera and blurring processing may be performed on the first image according to the depth information of the first image. When the view finding mode is a long shot mode, depth information of the second image may be determined by using the first image shot by the wide-angle camera and the second image shot by the telephoto camera and blurring processing may be performed on the second image according to the depth information of the second image.

In an example, after performing the blurring processing, the method may further include displaying the fourth image on a display of a hardware device equipped with the dual cameras or communicatively connected to the dual cameras, automatically or in response to an operation of a user.

At a second aspect, a mobile terminal is provided. The mobile terminal includes a wide-angle camera, a telephoto camera, a processor, and a memory, in which a computer program is stored. The computer program, when running in the processor, causes the processor to execute one or more actions as described above in the first aspect and the examples thereof.

At a third aspect, a method for dual-camera-based imaging is provided. The dual cameras include a wide-angle camera and a telephoto camera. The method includes the following actions. A first image shot by the wide-angle camera and a second image shot by the telephoto camera is acquired. An image corresponding to a present shooting condition is determined based on the first image and the second image. Depth information of the image corresponding to the present shooting condition is determined. Blurring processing is performed on the image corresponding to the present shooting condition according to the depth information, to obtain a fourth image.

In an example, the preset shooting condition may include an ambient light intensity, and before acquiring the first image shot by the wide-angle camera and the second image shot by the telephoto camera, the method may further include metering the ambient light intensity. In terms of acquiring the first image shot by the wide-angle camera and the second image shot by the telephoto camera, the wide-angle camera may be controlled to shoot the first image and the telephoto camera may be controlled to shoot the second image.

In an example, the preset shooting condition may further include a view finding mode that is selected at present, the view finding mode may include a close shot mode and a long shot mode. When the ambient light intensity is higher than or equal to the threshold light intensity, in terms of determining the image corresponding to a present shooting condition based on the first image and the second image, when the view finding mode is the close shot mode, depth information of the first image may be determined according to the first image shot by the wide-angle camera and the second image shot by the telephoto camera; when the view finding mode is the long shot mode, depth information of the second image may be determined by using the first image shot by the wide-angle camera and the second image shot by the telephoto camera.

In an example, when the ambient light intensity is lower than a threshold light intensity, in terms of determining the image corresponding to a present shooting condition based on the first image and the second image, the first image may be cropped according to a target region of the first image, to obtain an intersection of a first part of the first image corresponding to the target region and a second part of the first image corresponding to the distributed region as the image corresponding to the present shooting condition.

At a fourth aspect, a mobile terminal is provided. The mobile terminal includes a wide-angle camera, a telephoto camera, a processor, and a memory, in which a computer program is stored. The computer program, when running in the processor, causes the processor to execute one or more actions as described above in the third aspect and the examples thereof.

At a fifth aspect, a non-transitory computer readable storage medium is provided, in which a computer program is stored. The computer program, when running in a processor, causes the processor to execute one or more actions as described above in the first or third aspect and the examples thereof.

FIG. 1 illustrates a flowchart of a method for dual-camera-based imaging according to an embodiment of the disclosure.

As illustrated in FIG. 1, the method includes the following operations illustrated in blocks. The method may start at block 101.

At block S101, a first shot image shot by a wide-angle camera and a second shot image shot by a telephoto camera are acquired.

Specifically, a photographic device of a mobile terminal is turned on, and the wide-angle camera and telephoto camera of the photographic device simultaneously find views to obtain the first shot image for imaging and the second shot image for calculating a field depth respectively.

Before image capturing, an image sensor of a photographic set meters an ambient light intensity, and when it is determined that the present ambient light intensity is lower than a threshold light intensity, a dark environment is determined.

This is because, in the dark environment, little light is incident into the telephoto camera, and if the telephoto camera is used for imaging, an obtained picture may have many noise points and an imaging effect is relatively poor. However, in the dark environment, an imaging effect of a central part of an image shot by the wide-angle camera is still relatively good. Therefore, a relatively good imaging effect may be achieved by using the wide-angle camera for imaging and using the telephoto camera for assisting in calculation of the field depth.

At block S102, the first shot image is cropped according to a preset target region to acquire an imaging image.

Figure 2:
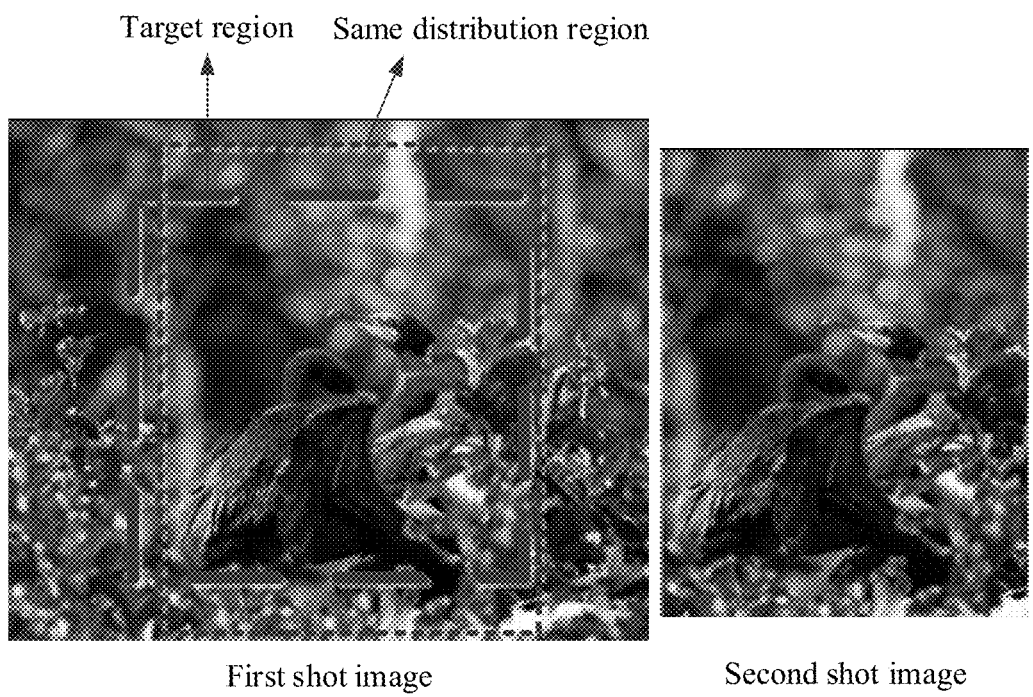
FIG. 2 illustrates a schematic diagram of shot images according to an embodiment.

Specifically, at first, a distribution region having a same view as that of the second shot image is determined from the first shot image. Since a field of view of the wide-angle camera is larger than that of the telephoto camera, for a same scene being shot, an image region of the first shot image shot by the wide-angle camera is relatively larger than an image region of the second shot image shot by the telephoto camera. FIG. 2 illustrates a schematic diagram of shot images according to the embodiment. As illustrated in FIG. 2, a view range of the first shot image is relatively wider than a view range of the second shot image, a part of the first shot image having a same view as that of the second shot image, i.e., what is in a fine dashed box of the first image and called a distribution region of the first shot image, is found from the first shot image.

A target region may be a central region of the first shot image, and the central region is an image in a certain range radiated from a center, i.e., a central point of the first shot image, to an edge of the first shot image. For example, an image range in a thick dashed box in FIG. 2 is the target region of the first shot image. This is because there is peripheral distortion for the wide-angle camera which results in a poor imaging effect. To obtain a relatively good imaging image and ensure the imaging effect, the first shot image shot by the wide-angle camera is cropped. The imaging effect of the central region is relatively good, the central region of the image is retained and a peripheral distorted region is removed to improve the imaging effect of the wide-angle camera.

Furthermore, sizes of the target region and a distribution region are determined, thereby determining the imaging image. Specifically, if a range of the distribution region is wider than a range of the target region, the part of the first shot image corresponding to the target region is determined to be the imaging image. If the range of the target region is wider than the range of the distribution region, the part of the first shot image corresponding to the distribution region is determined to be the imaging image. If the target region and the distribution region have a partially overlapped region, the part of the first shot image corresponding to the partially overlapped region is determined to be the imaging image.

It is to be noted that the specific range of the target region may specifically be set by those skilled in the art according to one or more imaging parameters, for example, a resolution, of the wide-angle camera, shooting environment and the like in a practical application.

In a possible implementation, the specific range of the target region may be set according to the resolution of the wide-angle camera, a peripheral distortion degree and the like. An optical design of the wide-angle camera causes an inevitable peripheral distortion under a large-field-of-view condition. Specifically, paraxial imaging meets an imaging relationship of y'f×tan(T), where y' is a radial dimension of the sensor, T is the field of view and f is a focal length. The radial dimension y' of the sensor is constant, so that T is undoubtedly increased when f is reduced, namely under the condition of a short focus end, and then a wide angle may be achieved. However, an imaging rule gradually gets inconsistent with a paraxial condition under the large-field-of-view condition and the imaging relationship meeting y'=f×tan(T) gradually turns to be close to a y=f×T rule, so as to result in negative distortion in a large field of view. Such a distortion is significant on a periphery of the image.

On the basis of the above distortion principle, it can be seen that a peripheral distortion degree is associated with a size of the field of view to a certain extent. Therefore, the specific range of the target region may be determined according to at least one of the field of view and resolution of the wide-angle camera.

Alternatively, the range of the target region may be determined only according to the field of view of the wide-angle camera. When the field of view is larger, a peripheral distortion range is wider, the set range of the target region is closer to the center of the image, the set range of the target region is narrower, the resolution is lower. When the field of view is smaller, the peripheral distortion range is relatively narrower, the set range of the target region may be enlarged and the resolution is increased.

Alternatively, the range of the target region is determined only according to the resolution of the wide-angle camera. When the resolution of the wide-angle camera is higher and, meanwhile, a size of the image sensor is reasonably set, imaging quality is higher, the set range of the target region is wider and the resolution is higher. When the resolution of the wide-angle camera is lower, the imaging quality is reduced, the set range of the target region is narrower and the resolution is lower.

This is because, under the condition of the same resolution, when the size of the image sensor is larger, the imaging quality is higher. When the size of the image sensor is fixed, if the resolution is increased, the image quality may be reduced; if the resolution is reduced, an image granularity is increased, and the image quality may also be reduced.

Alternatively, the set range of the target region may be determined according to both of the field of view and resolution of the wide-angle camera. When the field of view of the wide-angle camera is smaller and the resolution of the image is higher, the image quality is higher, the range of the target region may be set to be wider, and a resolution of the target region is higher. On the contrary, the range of the target region is narrower. Specifically, a mapping relationship between a combination of the field of view and resolution of the wide-angle camera and the resolution of the target region may be set, and the mapping relationship may be pre-calibrated by experience. For example, a combination of a field of view and resolution of different wide-angle cameras may be used for shooting, a maximum range in which there is no distortion (or a distortion degree is within a tolerance range) in a shot image may be determined, and the resolution of the target region may be determined according to the maximum range.

In another possible implementation, the range of the target region may be determined according to ambient luminance. When the ambient luminance is higher, the imaging quality of the image is higher, and a relatively large target region may be set, that is, the resolution of the target region may be relatively high.

At block S103, depth information of the imaging image is acquired according to the imaging image and the second shot image.

Specifically, since the first shot image and the second shot image are shot by different cameras respectively and there is a certain distance between the two cameras, it may brought a disparity. In addition, since the imaging image is obtained by cropping the first shot image, there is also such a disparity between the imaging image and the second shot image. After the imaging image and the second shot image are registered, depth information of the same object in the imaging image and the second shot image, i.e., a distance between the object and a plane where the wide-angle camera and the telephoto camera are located, may be calculated according to a triangulation ranging principle.

For clarifying the process, the triangulation ranging principle will be briefly introduced below.

Figure 3:
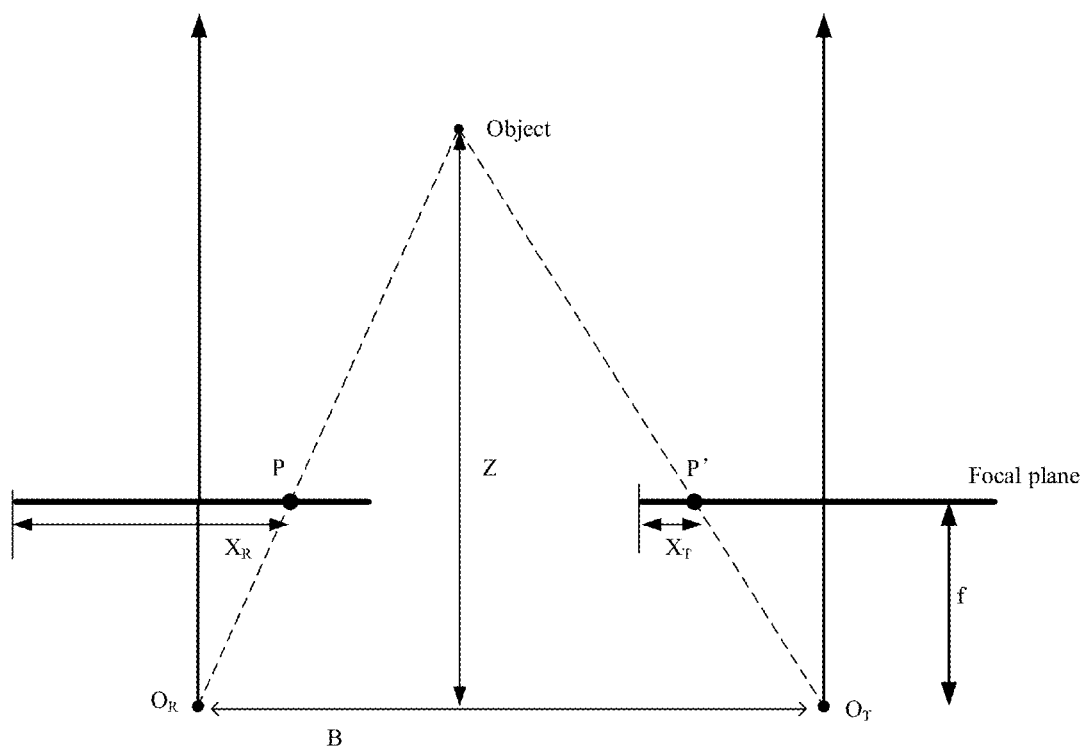
FIG. 3 illustrates a schematic diagram of a triangulation ranging principle.

In a practical scenario, a depth of a view feature is mainly resolved by binocular vision. This is the same as a principle of resolving the depth by dual cameras. In the embodiment, a main method for calculating the depth information of the imaging image according to the second shot image is the triangulation ranging principle. FIG. 3 illustrates a schematic diagram of the triangulation ranging principle.

In FIG. 3, an imaging object, positions $O_R$ and $O_T$ of the two cameras, and a focal plane of the two cameras are illustrated in a practical space. A distance between the focal plane and the plane where the two cameras are located is f. The two cameras perform imaging at a position of the focal plane, thereby obtaining two shot images.

P and P' are positions of the same object in different shot images respectively, where a distance between P and a left boundary of the corresponding shot image is $X_R$, and a distance between P' and a left boundary of the corresponding shot image is $X_T$. $O_R$ and $O_T$ represent the two cameras respectively, and the two cameras are located in the same plane and have a distance B.

On the basis of the triangulation ranging principle, the distance Z between the object and plane where the two cameras are located in FIG. 2A have the following relationship:

$$\frac{B}{Z} = \frac{(B + X_T) - X_R}{Z - f}.$$

On such a basis, $$Z = \frac{Bf}{X_R - X_T} = \frac{Bf}{d}$$

may be calculated, where d is a distance difference between the positions of the same object in different shot images. Since B and f are fixed values, the distance Z of the object may be determined according to d.

In S104, blurring processing is performed on the imaging image according to the depth information to obtain a required target image.

Specifically, after the depth information of the imaging image is calculated, whether each object is a foreground object or a background object may be determined, according to depth information of the object in the imaging image. In general, when the depth information indicates that the object is relatively close to the plane where the main and auxiliary cameras are located and a depth value is relatively small, it may be determined that the object is a foreground object, otherwise the object is a background object.

Blurring processing may be performed on the recognized background to obtain a target image. In the target image, the foreground is more highlighted, the background is blurred, and a foreground-focused imaging effect is achieved.

In the method for dual-camera-based imaging of the embodiment of the disclosure, the first shot image shot by the wide-angle camera and the second shot image shot by the telephoto camera are acquired, the first shot image is cropped according to the preset range of the target region to acquire the imaging image, the depth information of the imaging image is calculated according to the imaging image and the second shot image, and blurring processing is performed on the imaging image according to the depth information to obtain the required target image. The wide-angle camera is determined to be a first camera, the telephoto camera is determined to be a second camera, and the first shot image shot by the wide-angle camera is cropped according to the target region to obtain the imaging image. Therefore, a relatively good imaging image may be obtained in a dark environment, an imaging effect is ensured, and the technical problem of relatively poor imaging effect of dual cameras in the dark environment on the conventional art is solved.

Figure 4:
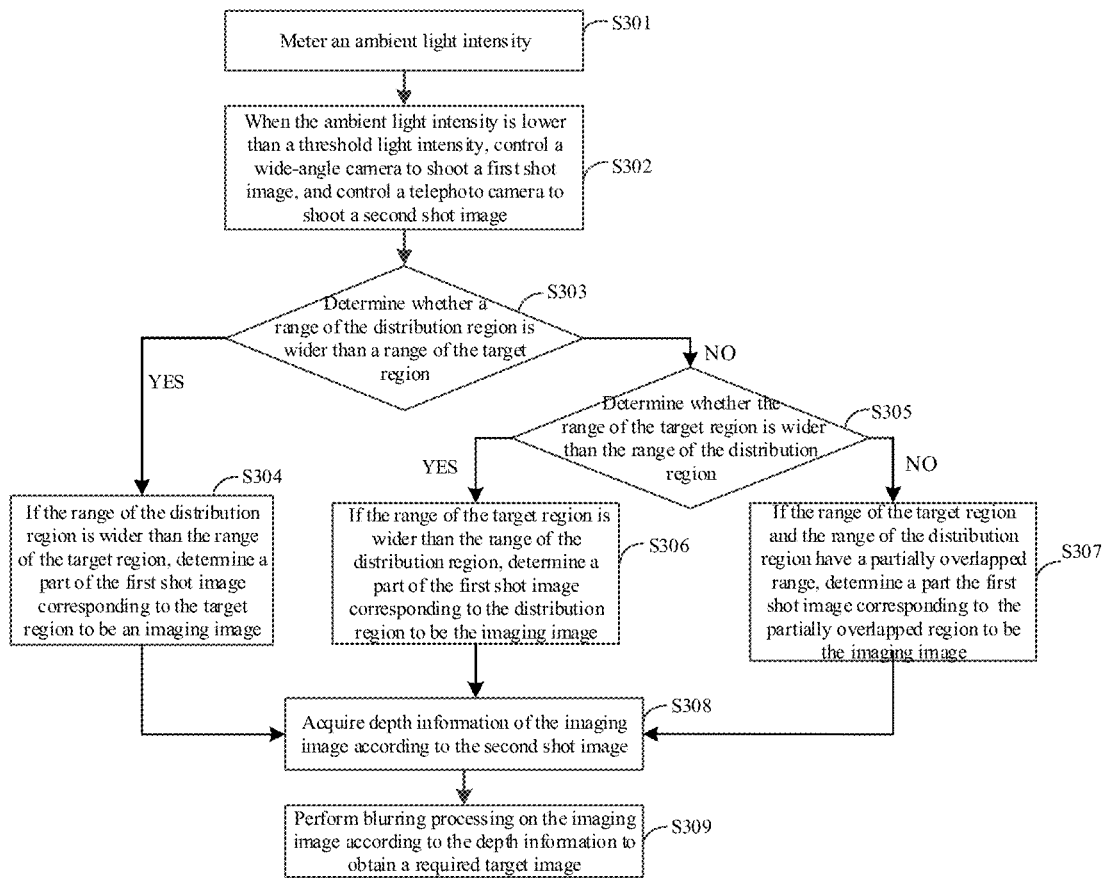
FIG. 4 illustrates a flowchart of another method for dual-camera-based imaging according to an embodiment of the application.

In order to clearly describe the previous embodiment, an embodiment of the disclosure further discloses another method for dual-camera-based imaging. FIG. 4 illustrates a flowchart of another method for dual-camera-based imaging according to an embodiment of the disclosure. As illustrated in FIG. 4, the method includes the following operations illustrated in blocks. The method may start at block S301.

At block S301, an ambient light intensity is metered.

Specifically, in a possible implementation, an independent photometric component is used to meter the ambient light intensity and output an ambient light intensity value.

In another possible implementation, an image sensor of a photographic set acquires a present ambient light intensity and outputs an ambient light intensity value.

In another possible implementation, automatically regulated International Organization for Standardization (ISO) values of a wide-angle camera and a telephoto camera may be read, ambient luminance is determined according to the read ISO values and the current ambient light intensity value is determined according to a mapping relationship between ambient luminance and a light intensity value. In general, the wide-angle camera and the telephoto camera should use the same ISO value, so that the corresponding ambient luminance may be determined by using the ISO value. However, if the read ISO value of the telephoto camera and ISO value of the wide-angle camera are different from each other, the corresponding ambient luminance may be determined according to an average of the two.

It is to be noted that an ISO value is used to indicate the sensitivity of a camera. Common ISO values include 50, 100, 200, 400, 1,000 and the like. A camera may automatically regulate the ISO value according to the ambient luminance. Therefore, in the embodiment, the ambient luminance may be deduced from the ISO values. In general, under a sufficient light condition, the ISO value is 50 or 100, and under an insufficient light condition, the ISO value may be 400 or higher.

At block S302, when the ambient light intensity is lower than a threshold light intensity, a wide-angle camera is controlled to shoot a first shot image and a telephoto camera is controlled to shoot a second shot image.

Specifically, the metered ambient light intensity value is compared with the threshold light intensity value. When the ambient light intensity is lower than the threshold light intensity, that is, a shooting environment is relatively dark, using the method of the embodiment of the disclosure may improve an imaging effect.

A photographic device of a mobile terminal is turned on, and the wide-angle camera and the telephoto camera are driven to simultaneously capture images to obtain the first shot image for imaging and the second shot image for calculating a field depth respectively.

At block S303, it is determined whether a range of the distribution region is wider than a range of the target region. If YES, block S304 is executed. If NO, block S305 is executed.

Specifically, since a periphery of an image shot by the wide-angle camera is distorted in a dark environment and a target region imaging effect corresponding to a central region is relatively good, a view may be imaged in a target region of the first shot image during shooting. Although the wide-angle camera and the telephoto camera simultaneously capture the images, there may be a certain difference between the views because of limits of lens parameters, so that it is necessary to determine a distribution region of the first shot image that has a same view as that of the second shot image. During calculation of depth information, depth information of an object only existing in one of the views may not be calculated. Therefore, for conveniently calculating the depth information, in the embodiment, the first shot image is cropped, to get a part located in the distribution region from the target region of the first shot image as much as possible, to be an imaging image, thereby ensuring accuracy of depth information of the imaging image.

At block S304, if the range of the distribution region is wider than the range of the target region, a part of the first shot image corresponding to the target region is determined to be an imaging image.

Specifically, if the range of the distribution region is wider than the range of the target region, all objects in the target region are imaged in the distribution region, and thus the part of the first shot image corresponding to the target region is determined to be the imaging image.

At block S305, it is determined whether the range of the target region is wider than the range of the distribution region. If YES, block S306 is executed. If NO, block S307 is executed.

The operation specifically may be seen from related descriptions in block S303 in the embodiment and will not be elaborated herein.

At block S306, if the range of the target region is wider than the range of the distribution region, a part of the first shot image in the range of the distribution region is determined to be the imaging image.

Specifically, if the range of the target region is wider than the range of the distribution region, all objects in the distribution region are imaged in the target region, and thus the part of the first shot image corresponding to the distribution region is determined to be the imaging image.

At block S307, if the target region and the distribution region have a partially overlapped region, a part of the first shot image corresponding to the partially overlapped region is determined to be the imaging image.

Specifically, if the target region and the distribution region have the partially overlapped region, each object in the overlapped region is imaged in both of the distribution region and the target region, and thus the part of the first shot image corresponding to the partially overlapped region is determined to be the imaging image.

At block S308, depth information of the imaging image is calculated according to the second shot image.

Specifically, the depth information of the imaging image is determined according to a position deviation of the same object in the second shot image and the first shot image, and parameters of the dual cameras.

The specific calculation process may be seen from related descriptions about block 103 in the abovementioned embodiment and will not be elaborated in the embodiment.

At block S309, blurring processing is performed on the imaging image according to the depth information to obtain a required target image.

Specifically, after the depth information of the imaging image is calculated, whether each object is a foreground or a background may be determined according to depth information of the object in the imaging image. In general, when the depth information indicates that the object is relatively close to the plane where the main and auxiliary cameras are located and a depth value is relatively small, it may be determined that the object is a foreground object, otherwise the object is a background object. Furthermore, blurring processing may be performed on the recognized background to obtain the target image.

In the method for dual-camera-based imaging of the embodiments of the disclosure, the first shot image shot by the wide-angle camera and the second shot image shot by the telephoto camera are acquired, the first shot image is cropped according to the preset range of the target region to acquire the imaging image, the depth information of the imaging image is acquired according to the imaging image and the second shot image, and blurring processing is performed on the imaging image according to the depth information to obtain the required target image. The wide-angle camera is determined to be a first camera, the telephoto camera is determined to be a second camera, and the first shot image shot by the wide-angle camera is cropped according to the target region to obtain the imaging image. Therefore, a relatively good imaging image may be obtained in a dark environment, an imaging effect is ensured, and the technical problem of relatively poor imaging effect of dual cameras in the dark environment on the conventional art is solved. In addition, cropping the target image also increases an image processing speed and reduces time required by image processing.

Figure 5:
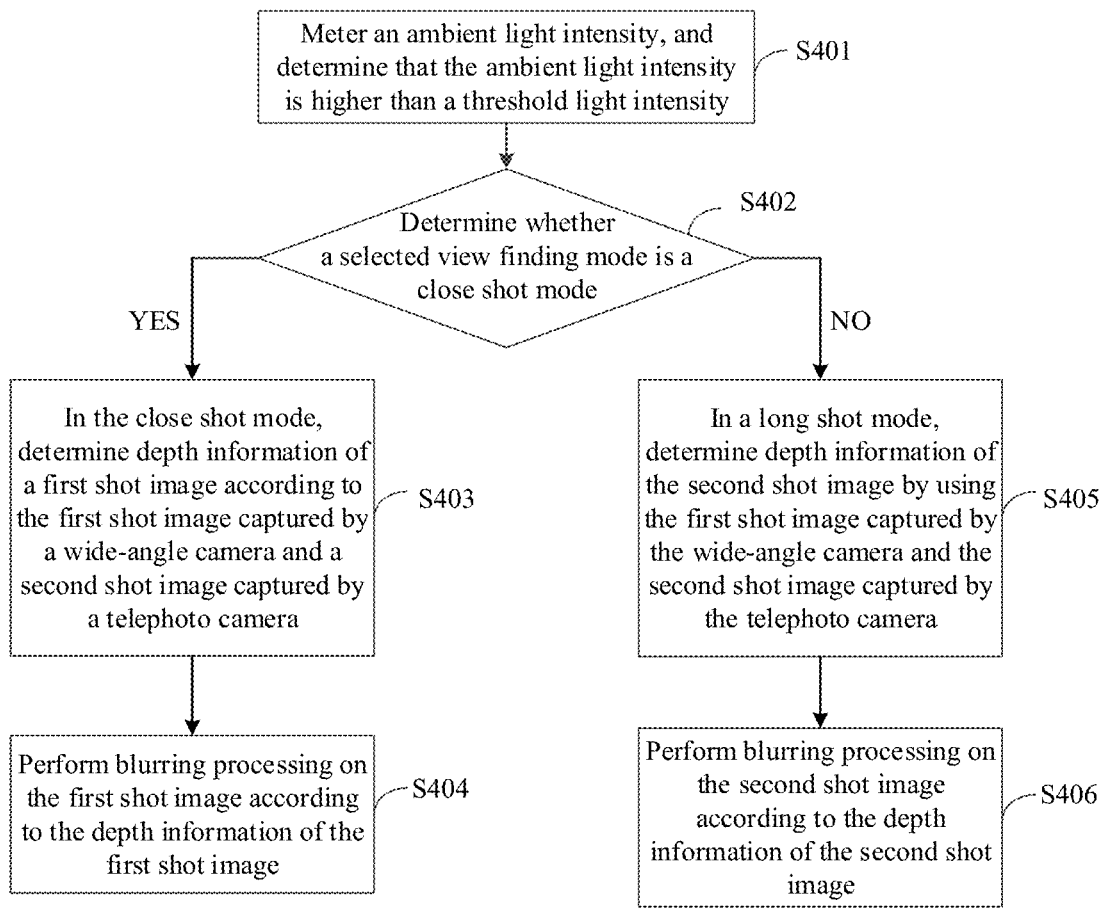
FIG. 5 illustrates a flowchart of another method for dual-camera-based imaging according to an embodiment of the application.

A dual-camera-based image processing method under the condition that the ambient light intensity is lower than the threshold light intensity is described in the abovementioned embodiments. On the basis of the abovementioned embodiment, the invention further discloses a possible implementation of a method for dual-camera-based imaging. An image processing method under the condition that the ambient light intensity is higher than the threshold light intensity after the ambient light intensity is metered is specifically described. FIG. 5 illustrates a flowchart of another method for dual-camera-based imaging according to an embodiment of the invention. As illustrated in FIG. 5, on the basis of the previous embodiment, after block S301, the method may further include the following operations illustrated in blocks. The method may start at block S401.

At block S401, it is determined that the ambient light intensity is higher than the threshold light intensity.

At block S402, whether a selected view finding mode is a close shot mode or not is determined, if it is the close shot mode, S403 is executed, and if it is a long shot mode, S405 is executed.

Specifically, when the ambient light intensity is higher than the threshold light intensity, it indicates there is relatively good light in the current shooting environment. In this case, a camera may work in one of two shooting modes, i.e., the close shot mode and the long shot mode. In the close shot mode, a focusing distance is relatively short, for example, the focusing distance is 0.3 meter to 1 meter. The close shot mode is mainly used to shoot an image within a relatively close range, in which a main part and main feature of the shot object are highlighted. The close shot mode excels at exquisite portraying of an expression of a person or a main feature of a subject, for example, a headshot and close-up of the person. In the long shot mode, the focusing distance is relatively long, for example, the focusing distance is longer than 1 meter. The long shot mode is mainly used to shoot an image within a relatively long range. When a view finding range is relatively long, the nature is mainly taken as an expression object, an overall structure of the subject is emphasized while a detailed expression thereof is ignored.

At block S403, in the close shot mode, depth information of the first shot image is determined according to the first shot image shot by the wide-angle camera and the second shot image shot by the telephoto camera.

Specifically, under the relatively good light condition, both the wide-angle camera and the telephoto camera may achieve a relatively good imaging effect. The wide-angle camera is wide in lens angle, large in field of view and short in effective viewing distance, so that the wide-angle camera may achieve a better imaging effect in the close shot mode. Therefore, in the close shot mode, the wide-angle camera is used to acquire the first shot image configured for imaging and the telephoto camera is used to acquire the second shot image configured to assist in calculation of a field depth and determine the depth information of the first shot image. A method for calculating the depth information of the first shot image may refer to Step S308 in the embodiment corresponding to FIG. 4 and the same principle is used and will not be elaborated herein.

At block S404, blurring processing is performed on the first shot image according to the depth information of the first shot image.

The operation may be seen from block S309 in the embodiment corresponding to FIG. 4 and the same principle is used and will not be elaborated herein.

At block S405, in the long shot mode, depth information of the second shot image is determined by using the first shot image shot by the wide-angle camera and the second shot image shot by the telephoto camera.

Specifically, under the relatively good light condition, in the long shot mode, a focal length of the telephoto camera is larger than a camera with a standard focal length, is suitable for long-distance shooting and may achieve higher imaging quality. Therefore, the telephoto camera is, used to capture the second shot image for imaging, and the wide-angle camera is used to capture the first shot image for assisting in calculation of the field depth, and calculating and determining the depth information of the second shot image. A method for calculating the depth information of the second shot image may be seen from block S308 in the embodiment corresponding to FIG. 4 and the same principle is used and will not be elaborated herein.

At block S406, blurring processing is performed on the second shot image according to the depth information of the second shot image.

The step may be seen from block S309 in the embodiment corresponding to FIG. 4 and the same principle is used and will not be elaborated herein.

In the method for dual-camera-based imaging of the embodiment, when the ambient light intensity is higher than the threshold light intensity, the camera for capturing the image for imaging is switched according to the selected view finding mode, so that higher imaging quality and a better blurring effect are achieved.

In order to implement the abovementioned embodiments, the disclosure further provides a device for dual-camera-based imaging.

Figure 6:
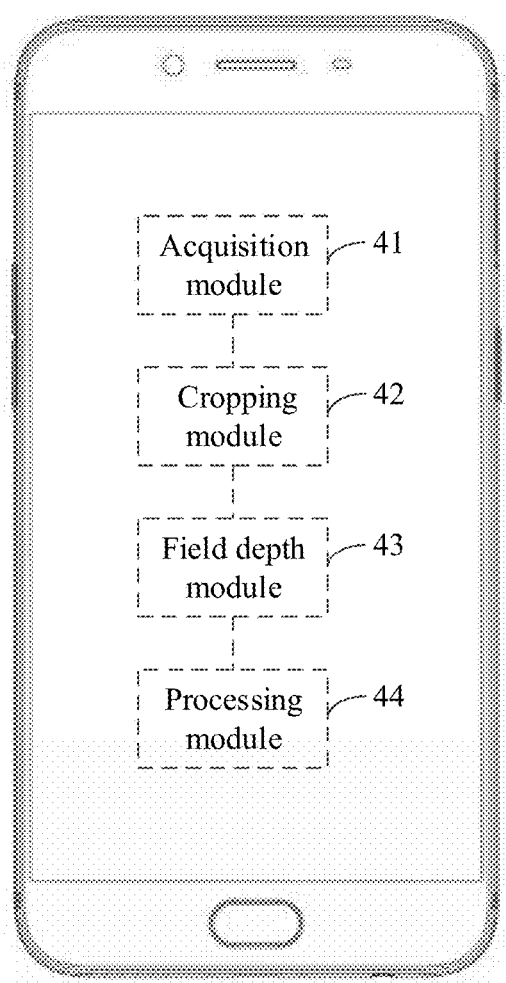
FIG. 6 illustrates a structure diagram of a device for dual-camera-based imaging according to an embodiment of the application.

FIG. 6 illustrates a structure diagram of a device for dual-camera-based imaging according to an embodiment of the disclosure.

As illustrated in FIG. 6, the device includes an acquisition module 41, a cropping module 42, a field depth module 43, and a processing module 44.

The acquisition module 41 may be configured to acquire a first shot image shot by a wide-angle camera and a second shot image shot by a telephoto camera.

The cropping module 42 may be configured to crop the first shot image according to a preset range of a target region to acquire an imaging image.

The field depth module 43 may be configured to acquire depth information of the imaging image according to the imaging image and the second shot image.

The processing module 44 may be configured to perform blurring processing on the imaging image according to the depth information to obtain a required target image.

It is to be noted that explanations and descriptions about the abovementioned method embodiment are also applied to the device of the embodiment and will not be elaborated herein.

In the device for dual-camera-based imaging of the embodiments of the disclosure, the acquisition module is configured to acquire the first shot image shot by the wide-angle camera and the second shot image shot by the telephoto camera. The cropping module crops the first shot image according to the preset range of the target region to acquire the imaging image. The field depth module is configured to acquire the depth information of the imaging image according to the imaging image and the second shot image. The processing module is configured to perform blurring processing on the imaging image according to the depth information to obtain the required target image. The wide-angle camera is determined to be a first camera, and the telephoto camera is determined to be a second camera. The first shot image shot by the wide-angle camera is cropped according to the target region to obtain the imaging image. Therefore, a relatively good imaging image may be obtained in a dark environment, an imaging effect is ensured, and the technical problem of relatively poor imaging effect of dual cameras in the dark environment on the conventional art is solved.

Figure 7:
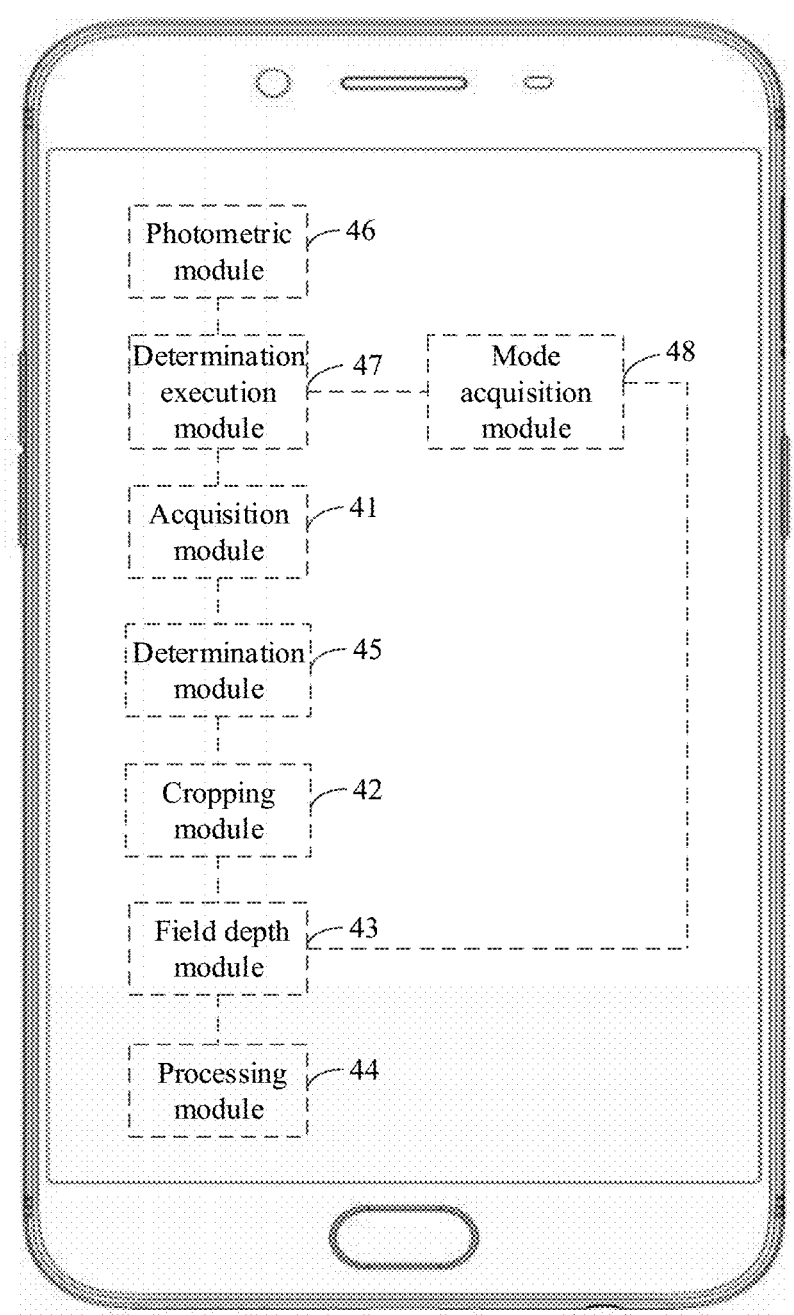
FIG. 7 illustrates a structure diagram of another device for dual-camera-based imaging according to an embodiment of the application.

On the basis of the abovementioned embodiments, an embodiment of the disclosure further provides a possible implementation of a device for dual-camera-based imaging. FIG. 7 illustrates a structure diagram of another device for dual-camera-based imaging according to an embodiment of the disclosure. As illustrated in FIG. 7, on the basis of the above embodiment, the device further includes a determination module 45, a photometric module 45, a determination execution module 47 and a mode acquisition module 48.

The determination module 45 may be configured to determine a distribution region of the first shot image having a same view as that of the second shot image.

In a possible implementation, the cropping module 42 may specifically be configured to, when a range of the distribution region is wider than the range of the target region, determine a part of the first shot image corresponding to the target region to be the imaging image.

In another possible implementation, the cropping module 42 is specifically configured to, when the range of the target region is wider than the range of the distribution region, determine a part of the first shot image corresponding to the distribution region to be the imaging image.

In another possible implementation, the cropping module 42 is specifically configured to, when the target region and the distribution region have a partially overlapped region, determine a part of the first shot image in the partially overlapped region to be the imaging image.

The photometric module 46 may be configured to meter an ambient light intensity.

The determination execution module 47, when the ambient light intensity is lower than a threshold light intensity, control the wide-angle camera to shoot the first shot image and control the telephoto camera to shoot the second shot image.

Furthermore, in a possible implementation of the embodiment, the determination execution module 47 may further be configured to determine that the ambient light intensity is higher than the threshold light intensity. The mode acquisition module 48 is configured to acquire a selected view finding mode. The field depth module 43 may further be configured to, when the view finding mode is a close shot mode, determine depth information of the first shot image according to the first shot image shot by the wide-angle camera and the second shot image shot by the telephoto camera. The processing module 44 may further be configured to perform blurring processing on the first shot image according to the depth information of the first shot image.

In another possible implementation, the field depth module 43 may further be configured to, when the view finding mode is a long shot mode, determine depth information of the second shot image by using the first shot image shot by the wide-angle camera and the second shot image shot by the telephoto camera. The processing module 44 may further be configured to perform blurring processing on the second shot image according to the depth information of the second shot image.

It is to be noted that explanations and descriptions about the abovementioned method embodiment are also applied to the device of the embodiment and will not be elaborated herein.

In the device for dual-camera-based imaging of the embodiment of the disclosure, the acquisition module is configured to acquire the first shot image shot by the wide-angle camera and the second shot image shot by the telephoto camera, the first shot image is cropped according to the preset target region to acquire the imaging image, the field depth module is configured to acquire the depth information of the imaging image according to the imaging image and the second shot image, and the processing module is configured to perform blurring processing on the imaging image according to the depth information to obtain the required target image. The wide-angle camera is determined to be a first camera, the telephoto camera is determined to be a second camera, and the first shot image shot by the wide-angle camera is cropped according to the target region to obtain the imaging image. Therefore, a relatively good imaging image may be obtained in a dark environment, an imaging effect is ensured, and the technical problem of relatively poor imaging effect of dual cameras in the dark environment on the conventional art is solved. In addition, cropping the target image also increases an image processing speed and reduces time required by image processing.

In order to implement the abovementioned embodiments, the disclosure further discloses a mobile terminal. FIG. 7 illustrates a structure diagram of terminal device according to another embodiment of the disclosure. As illustrated in FIG. 6, the terminal device 1000 includes a housing 1100, and a wide-angle camera 1112, a telephoto camera 1113, a memory 1114 and a processor 1115 which are located in the housing 1100.

An executable program code is stored in the memory 1114; and the processor 1115 reads the executable program code stored in the memory 1114 to run a program corresponding to the executable program code to implement the method for dual-camera-based imaging of the abovementioned method embodiment.

In order to implement the abovementioned embodiments, the disclosure further discloses a computer-readable storage medium, in which a computer program is stored. The program is executed by a processor of a mobile terminal to implement the method for dual-camera-based imaging in the abovementioned embodiments.

Figure 8:
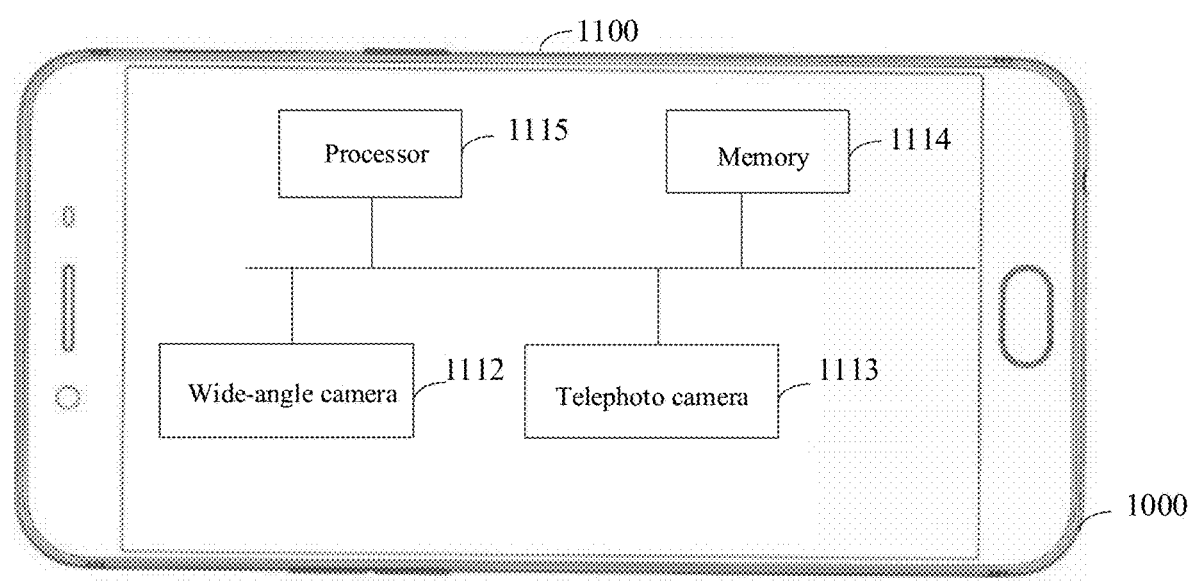
FIG. 8 illustrates a structure diagram of a terminal device according to another embodiment of the application.
Figure 9:
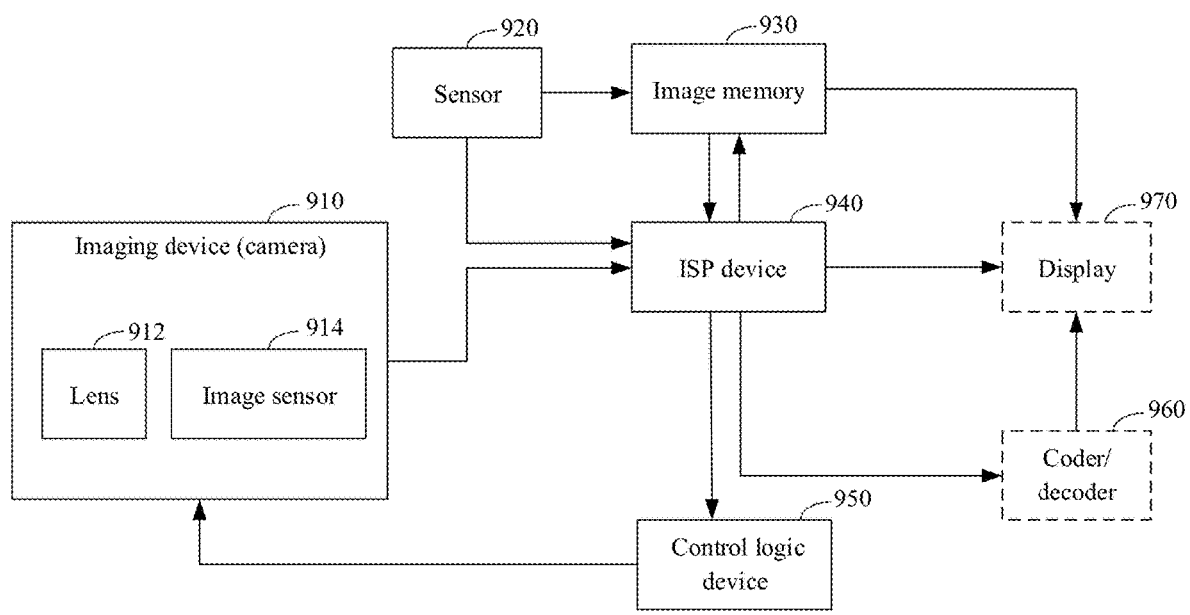
FIG. 9 illustrates a schematic diagram of an image processing circuit according to an embodiment.

The mobile terminal further includes an image processing circuit, and the image processing circuit may be implemented by use of hardware and/or software components, and may include various processing units defining an Image Signal Processing (ISP) pipeline. FIG. 8 illustrates a schematic diagram of an image processing circuit according to an embodiment. As illustrated in FIG. 8, various aspects of the image processing technology related to the embodiments of the disclosure are illustrated, for convenience of description.

As illustrated in FIG. 8, the image processing circuit includes an ISP device 940 and a control logic device 950. Image data shot by an imaging device 910 is processed by the ISP device 940 at first, and the ISP device 940 analyzes the image data to capture image statistical information for determining one or more control parameters of the ISP device and/or the imaging device 910. The imaging device 910 may specifically include two cameras, and each camera may include one or more lenses 912 and an image sensor 914. The image sensor 914 may include a color filter array (for example, a Bayer filter), and the image sensor 914 may acquire light intensity and wavelength information shot by each imaging pixel of the image sensor 914 and provide a set of original image data processable by the ISP device 940. A sensor 920 may provide the original image data to the ISP device 940 on the basis of an interface type of the sensor 920. An interface of the sensor 920 may use a Standard Mobile Imaging Architecture (SMIA) interface, another serial or parallel camera interface or a combination of the interfaces.

The ISP device 940 processes the original image data pixel by pixel according to multiple formats. For example, each image pixel may have a bit depth of 8, 10, 12 or 14 bits. The ISP device 940 may execute one or more image processing operations on the original image data and collect the image statistical information about the image data. The image processing operations may be executed according to the same or different bit depth accuracy.

The ISP device 940 may further receive the pixel data from an image memory 930. For example, the interface of the sensor 920 sends the original pixel data to the image memory 930, and the original pixel data in the image memory 930 is provided for the ISP device 940 for processing. The image memory 930 may be a part of a memory device, a storage device or an independent dedicated memory in an electronic device, and may include a Direct Memory Access (DMA) feature.

When receiving the original image data from the interface of the sensor 920 or from the image memory 930, the ISP device 940 may execute the one or more image processing operations, for example, time-domain filtering. The processed image data may be sent to the image memory 930 for other processing before displaying. The ISP device 940 receives the processed data from the image memory 930 and performs image data processing in an original domain and color spaces Red, Green and Blue (RGB) and YCbCr on the processed data. The processed image data may be output to a display 970 for a user to view and/or for further processing by a Graphics Processing Unit (GPU). In addition, output of the ISP device 940 may further be sent to the image memory 930, and the display 970 may read the image data from the image memory 930. In an embodiment, the image memory 930 may be configured to implement one or more frame buffers. Moreover, the output of the ISP device 940 may be sent to a coder/decoder 960 to code/decode the image data. The coded image data may be stored, and is decompressed before being displayed on the display 970. The coder/ decoder 960 may be implemented by a Central Processing Unit (CPU) or a GPU or a coprocessor.

The statistical information determined by the ISP device 940 may be sent to the control logic device 950. For example, the statistical information may include statistical information of automatic exposure, automatic white balance, automatic focusing, flashing detection, black level compensation, shading correction of the lens 912 and the like of the image sensor 914. The control logic device 950 may include a processor and/microcontroller executing one or more routines (for example, firmware), and the one or more routines may determine the control parameter of the imaging device 910 and the control parameter of the ISP device according to the received statistical data. For example, the control parameter may include a control parameter (for example, integral time for gain and exposure control) for the sensor 920, a camera flashing control parameter, a control parameter (for example, a focal length for focusing or zooming) for the lens 912 or a combination of these parameters. The control parameter for the ISP device may include a gain level and color correction matrix for automatic white balance and color regulation (for example, during RGB processing) and a shading correction parameter for the lens 912.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. In the specification, these terms are not always schematically expressed for the same embodiment or example. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only used for description and should not be understood to indicate or imply relative importance or implicitly indicate the number of indicated technical features. Therefore, a feature defined by "first" and "second" may explicitly or implicitly indicate inclusion of at least one such feature. In the descriptions of the disclosure, "multiple" means at least two, for example, two and three, unless otherwise limited definitely and specifically.

Any process or method in the flowcharts or described herein in another manner may be understood to represent a module, segment or part including codes of one or more executable instructions configured to realize specific logic functions or steps of the process and, moreover, the scope of the preferred implementation mode of the disclosure includes other implementation, not in a sequence illustrated or discussed herein, including execution of the functions basically simultaneously or in an opposite sequence according to the involved functions. This should be understood by those skilled in the art of the embodiments of the disclosure.

Logics and/or steps represented in the flowcharts or described herein in another manner, for example, may be considered as a fixed sequence list of executable instructions configured to realize the logic functions and may specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), a Random Access Memory (RAM), a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

It should be understood that each part of the disclosure may be implemented by hardware, software, firmware or a combination thereof. In the abovementioned implementation modes, multiple steps or methods may be implemented by software or firmware stored in a memory and executed by a proper instruction execution system. For example, in case of implementation with the hardware, like another implementation mode, any one or combination of the following technologies well-known in the art may be used for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the steps in the method of the abovementioned embodiment may be completed through related hardware instructed by a program, the program may be stored in a computer-readable storage medium, and when the program is executed, one or combination of the steps of the method embodiment is included.

In addition, each functional unit in each embodiment of the disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium.

The storage medium may be a read-only memory, a magnetic disk, an optical disk or the like. The embodiments of the disclosure have been illustrated or described above. However, it can be understood that the abovementioned embodiments are exemplary and should not be understood as limits to the disclosure and those of ordinary skill in the art may make variations, modifications, replacements, transformations to the abovementioned embodiments within the scope of the disclosure.

The invention claimed is:

1. A method for dual-camera-based imaging, wherein the dual cameras comprise a wide-angle camera and a telephoto camera, and the method comprises:
   acquiring a first image shot by the wide-angle camera and a second image shot by the telephoto camera;
   determining a distribution region of the first image having a same view as that of the second image;
   cropping the first image to obtain an intersection of a first part of the first image corresponding to a target region and a second part of the first image corresponding to the distributed region as a third image;
   determining depth information of the third image according to the third image and the second image; and
   performing blurring processing on the third image according to the depth information, to obtain a fourth image.

2. The method of claim 1, wherein the target region is a first part of the first image which takes a center of the first image as a center of the target region and spans a range determined according to at least one of the following:
   an angle of field of view of the wide-angle camera, a resolution of the wide-angle camera, or an ambient light luminance.

3. The method of claim 1, wherein obtaining the fourth image comprises:
   when the distribution region fully covers the target region, determining the first part of the first image corresponding to the target region to be the third image;
   when the target region fully covers the distribution region, determining the second part of the first image corresponding to the distributed region to be the third image; or
   when the target region and the distribution region have a partially overlapped region, determining a third part of the first image corresponding to the partially overlapped region to be the third image.

4. The imaging method of claim 1, before acquiring the first image shot by the wide-angle camera and the second image shot by the telephoto camera, further comprising:
   metering an ambient light intensity; and
   when the ambient light intensity is lower than a threshold light intensity, controlling the wide-angle camera to shoot the first image and controlling the telephoto camera to shoot the second image.

5. The method of claim 4, wherein controlling the wide-angle camera to shoot the first image and controlling the telephoto camera to shoot the second image comprises:
   controlling the wide-angle camera and the telephoto camera to perform view finding simultaneously, so as to acquire the first image for imaging and the second image for calculating a depth of field.

6. The method of claim 1, wherein after determining depth information of the third image, the method further comprises:
   for each of a plurality of objects in the third image, determining whether the object is a foreground object or a background object according to depth information of the object; and
   wherein performing blurring processing on the third image according to the depth information to obtain a fourth image comprises:
   performing blurring processing on the object determined to the background object, to obtain the fourth image.

7. The method of claim 4, wherein metering the ambient light intensity comprises one of the following:
   metering the ambient light intensity by using an independent photometric component;
   acquiring the ambient light intensity by using an image sensor; or
   reading automatically regulated International Organization for Standardization (ISO) values of the wide-angle camera and the telephoto camera, determining an ambient luminance according to the read ISO values, and determining the ambient light intensity according to a mapping relationship of ambient luminance values and ambient light intensity values.

8. The method of claim 4, after metering the ambient light intensity, further comprising:
   when the ambient light intensity is higher than or equal to the threshold light intensity,
   acquiring a selected view finding mode; and
   when the view finding mode is a close shot mode, determining depth information of the first image according to the first image shot by the wide-angle camera and the second image shot by the telephoto camera and performing blurring processing on the first image according to the depth information of the first image;
   when the view finding mode is a long shot mode, determining depth information of the second image by using the first image shot by the wide-angle camera and the second image shot by the telephoto camera and performing blurring processing on the second image according to the depth information of the second image.

9. The method of claim 1, further comprising: after performing the blurring processing,
   displaying the fourth image on a display of a hardware device equipped with the dual cameras or communicatively connected to the dual cameras, automatically or in response to an operation of a user.

10. A mobile terminal, comprising:
    a wide-angle camera,
    a telephoto camera,
    a processor, and
    a memory, in which a computer program is stored, wherein the computer program, when running in the processor, causes the processor to execute one or more actions, comprising:
    metering an ambient light intensity; and
    when the ambient light intensity is lower than a threshold light intensity,
       acquiring a first image shot by the wide-angle camera and a second image shot by the telephoto camera;
       cropping the first image according to a target region of the first image to acquire a third image;
       determining depth information of the third image according to the third image and the second image; and
       performing blurring processing on the third image according to the depth information to obtain a fourth image.

11. The mobile terminal of claim 10, wherein the target region is a first part of the first image which takes a center of the first image as a center of the target region and spans a range determined according to at least one of the following:
    an angle of field of view of the wide-angle camera, a resolution of the wide-angle camera, or the ambient light intensity.

12. The mobile terminal of claim 10, wherein before cropping the first image according to the target region of the first image to acquire the third image, the one or more actions further comprise:
  determining a distribution region of the first image having a same view as that of the second image,
  wherein cropping the first image according to the target region of the first image to acquire the third image comprises:
  cropping the first image to obtain an intersection of a first part of the first image corresponding to the target region and a second part of the first image corresponding to the distributed region as the fourth image.

13. The mobile terminal of claim 12, wherein obtaining the fourth image comprises:
  when the distribution region fully covers the target region, determining the first part of the first image corresponding to the target region to be the third image;
  when the target region fully covers the distribution region, determining the second part of the first image corresponding to the distributed region to be the third image; or
  when the target region and the distribution region have a partially overlapped region, determining a third part of the first image corresponding to the partially overlapped region to be the third image.

14. The mobile terminal of claim 10, wherein before acquiring the first image shot by the wide-angle camera and the second image shot by the telephoto camera, the one or more actions further comprise:
  metering an ambient light intensity; and
  when the ambient light intensity is lower than a threshold light intensity, controlling the wide-angle camera to shoot the first image and controlling the telephoto camera to shoot the second image.

15. The mobile terminal of claim 8, wherein the one or more actions further comprise:
  when the ambient light intensity is higher than or equal to the threshold light intensity,
    acquiring a selected view finding mode; and
    when the view finding mode is a close shot mode, determining depth information of the first image according to the first image shot by the wide-angle camera and the second image shot by the telephoto camera and performing blurring processing on the first image according to the depth information of the first image;
    when the view finding mode is a long shot mode, determining depth information of the second image by using the first image shot by the wide-angle camera and the second image shot by the telephoto camera and performing blurring processing on the second image according to the depth information of the second image.

16. A method for dual-camera-based imaging, wherein the dual cameras comprise a wide-angle camera and a telephoto camera, and the method comprises:
  acquiring a first image shot by the wide-angle camera and a second image shot by the telephoto camera;
  determining an image corresponding to a present shooting condition based on the first image and the second image;
  determining depth information of the image corresponding to the present shooting condition; and
  performing blurring processing on the image corresponding to the present shooting condition according to the depth information, to obtain a fourth image.

17. The method of claim 16, wherein the preset shooting condition comprises ambient light intensity,
  wherein before acquiring the first image shot by the wide-angle camera and the second image shot by the telephoto camera, the method further comprises:
  metering an ambient light intensity; and
  wherein acquiring the first image shot by the wide-angle camera and the second image shot by the telephoto camera comprises:
  controlling the wide-angle camera to shoot the first image and controlling the telephoto camera to shoot the second image.

18. The method of claim 17, wherein the preset shooting condition further comprises a view finding mode that is selected at present, the view finding mode comprises a close shot mode and a long shot mode,
  wherein when the ambient light intensity is higher than or equal to the threshold light intensity, determining the image corresponding to a present shooting condition based on the first image and the second image comprises:
  when the view finding mode is the close shot mode, determining depth information of the first image according to the first image shot by the wide-angle camera and the second image shot by the telephoto camera;
  when the view finding mode is the long shot mode, determining depth information of the second image by using the first image shot by the wide-angle camera and the second image shot by the telephoto camera.

19. The method of claim 17, wherein when the ambient light intensity is lower than a threshold light intensity, determining the image corresponding to a present shooting condition based on the first image and the second image comprises:
  cropping the first image according to a target region of the first image, to obtain an intersection of a first part of the first image corresponding to the target region and a second part of the first image corresponding to the distributed region as the image corresponding to the present shooting condition.

* * * * *